US011813991B2

(12) United States Patent
Grant et al.

(10) Patent No.: US 11,813,991 B2
(45) Date of Patent: Nov. 14, 2023

(54) MOUNT ASSEMBLY (71) Applicant: PORTABLE MULTIMEDIA LTD, West End (GB)

(72) Inventors: Robert Grant, West End (GB); Graham Lambert, West End (GB); Ceri Hill, West End (GB)

(*) Notice: Subject to any disclaimer, the term of this patent is extended or adjusted under 35 U.S.C. 154(b) by 204 days.

(21) Appl. No.: 17/421,375

(22) PCT Filed: Jan. 7, 2020

(86) PCT No.: PCT/GB2020/050032
§ 371 (c)(1),
(2) Date: Jul. 7, 2021

(87) PCT Pub. No.: WO2020/144473
PCT Pub. Date: Jul. 16, 2020

(65) Prior Publication Data
US 2022/0090729 A1  Mar. 24, 2022

(30) Foreign Application Priority Data

Jan. 7, 2019 (GB) ..................................... 1900211
Jan. 7, 2019 (GB) ..................................... 1900214
(Continued)

(51) Int. Cl.
*B60R 11/04* (2006.01)
*B60R 11/02* (2006.01)
(Continued)

(52) U.S. Cl.
CPC .......... *B60R 11/04* (2013.01); *B60R 11/0258* (2013.01); *F16M 11/14* (2013.01);
(Continued)

(58) Field of Classification Search
CPC ...... F16M 13/022; F16M 11/14; B60R 11/04; B60R 11/0258
(Continued)

(56) References Cited

U.S. PATENT DOCUMENTS 4,566,663 A * 1/1986 Barchus ................. F16M 11/14
248/921
5,132,492 A * 7/1992 Wieder ................. H02G 3/0633
174/535
(Continued)

FOREIGN PATENT DOCUMENTS

CN    203896433 U    10/2014
CN    207416725 U     5/2018
(Continued)

OTHER PUBLICATIONS

International Search Report and Written Opinion for PCT/GB2020/050033 dated Mar. 16, 2020, 8 pages.
(Continued)

*Primary Examiner* — Todd M Epps
(74) *Attorney, Agent, or Firm* — Armstrong Teasdale LLP (57) ABSTRACT Described herein is a mount assembly for mounting a device to a surface, including: a socket assembly; a mounting element including a mounting ball receivable by the socket assembly to pivotally couple the mounting element to the socket assembly to position the mounting element relative to the socket assembly; where the socket assembly includes: a resilient member configured to define a socket to receive and engage the mounting ball, the resilient member configured to permit the mounting ball to be urged into the socket against a resilient bias; a biasing element to bias the resilient member into the socket; and a retention element to inhibit deflection of an end of the resilient member away from the socket.

23 Claims, 9 Drawing Sheets (30) Foreign Application Priority Data

Jan. 7, 2019 (GB) .................................... 1900215
Jan. 7, 2019 (GB) .................................... 1900216
Mar. 11, 2019 (GB) .................................... 1903292

(51) Int. Cl.
| | | |
|---|---|---|
| *F16M 11/14* | (2006.01) | |
| *F16M 13/02* | (2006.01) | |
| *F16M 11/04* | (2006.01) | |
| *G03B 17/56* | (2021.01) | |
| *B60R 11/00* | (2006.01) | |

(52) U.S. Cl.
CPC .... *F16M 13/022* (2013.01); *B60R 2011/0089* (2013.01); *F16M 11/04* (2013.01); *F16M 2200/021* (2013.01); *G03B 17/561* (2013.01)

(58) Field of Classification Search
USPC ...................................................... 248/176.1
See application file for complete search history.

(56) References Cited

U.S. PATENT DOCUMENTS

| | | | | |
|---|---|---|---|---|
| 6,170,967 | B1* | 1/2001 | Usher | F21V 21/35 |
| | | | | 200/227 |
| 9,568,148 | B2* | 2/2017 | Carnevali | F16M 13/00 |
| 10,569,717 | B2* | 2/2020 | Peters | F16M 11/08 |
| 2002/0003874 | A1 | 1/2002 | Peiker | |
| 2002/0088916 | A1 | 7/2002 | March et al. | |
| 2004/0125476 | A1 | 7/2004 | Boddy et al. | |
| 2004/0195486 | A1* | 10/2004 | Rumsey | B60R 1/04 |
| | | | | 248/481 |
| 2005/0270620 | A1 | 12/2005 | Bauer et al. | |
| 2007/0090238 | A1 | 4/2007 | Justis | |
| 2007/0152115 | A1 | 7/2007 | Chou | |
| 2009/0002491 | A1 | 1/2009 | Haler | |
| 2010/0128423 | A1 | 5/2010 | Moscovitch | |
| 2011/0095159 | A1 | 4/2011 | Carnevali | |
| 2011/0223802 | A1 | 9/2011 | Zeller et al. | |
| 2013/0150122 | A1 | 6/2013 | Kulas | |
| 2014/0034794 | A1 | 2/2014 | Carnevali | |
| 2014/0097320 | A1 | 4/2014 | Rizk et al. | |
| 2015/0184797 | A1 | 7/2015 | Ma | |
| 2017/0041516 | A1 | 2/2017 | Aliveira | |
| 2018/0056888 | A1 | 3/2018 | Wang | |
| 2020/0114835 | A1 | 4/2020 | Chiu et al. | |

FOREIGN PATENT DOCUMENTS

| | | |
|---|---|---|
| CN | 208119076 U | 11/2018 |
| CN | 109263567 A | 1/2019 |
| CN | 208682754 U | 4/2019 |
| CN | 208901030 U | 5/2019 |
| CN | 210011689 U | 2/2020 |
| EP | 1743804 A1 | 1/2007 |
| EP | 3264740 A1 | 1/2018 |
| KR | 20020006162 A | 1/2002 |
| WO | 2009117865 A1 | 10/2009 |
| WO | 2014195745 A1 | 12/2014 |
| WO | 2015070605 A | 5/2015 |

OTHER PUBLICATIONS

International Search Report and Written Opinion for PCT/GB2020/050031 dated Mar. 16, 2020, 8 pages.
International Search Report and Written Opinion for PCT/GB2020/050032 dated Mar. 17, 2020, 8 pages.
Search Report under Section 17 for GB Application No. GB1900216.1, search dated May 29, 2020, 2 pages.
Search Report under Section 17 for GB Application No. GB1900215.3, search dated Jun. 18, 2020, 2 pages.
Search Report under Section 17 for GB Application No. GB1900214.6, search dated Jun. 22, 2020, 1 page.
Search Report under Section 17 for GB Application No. GB1903292.9, search dated Jun. 22, 2020, 1 page.
Search Report under Section 17 for GB Application No. GB1903294.5, search dated Jun. 23, 2020, 2 pages.
Search Report under Section 17 for GB Application No. GB1900211.2, search dated Jun. 25, 2020, 1 page.
Search Report under Section 17 for GB Application No. GB1903293.7, search dated Jun. 22, 2020, 2 pages.

* cited by examiner

MOUNT ASSEMBLY

CROSS-REFERENCE TO RELATED APPLICATIONS

This application is a U.S. National Phase Application of International Patent Application No. PCT/GB2020/050032, filed Jan. 7, 2020, which claims priority to Great Britain Patent Application No. 1900214.6, filed Jan. 7, 2019, and which claims priority to Great Britain Patent Application No. 1900215.3, filed Jan. 7, 2019, and which claims priority to Great Britain Patent Application No. 1900216.1, filed Jan. 7, 2019, and which claims priority to Great Britain Patent Application No. 1900211.2, filed Jan. 7, 2019, and which claims priority to Great Britain Patent Application No. 1903292.9, filed Mar. 11, 2019, the entire contents of each of which are hereby incorporated by reference herein.

TECHNICAL FIELD

The present invention relates to a mount assembly for mounting a device to a surface. In particular, but not exclusively, the present invention relates to a mount assembly for mounting an accessory in a vehicle.

BACKGROUND

Camera systems for vehicles such as, for example, on-board camera systems, dashboard cameras, in-vehicle systems, etc. are increasing in use and popularity. Such camera systems are sometimes referred to as "Dash Cams" because they are often mounted to a vehicle dashboard. They are often installed into a vehicle after the overall vehicle has been manufactured, as an "after-sales" modification or personalisation of the vehicle by a user and are employed as a means to capture images of an area in and/or around a vehicle. Images captured by such systems may be used as evidence in the case of an accident, damage, or the like. Often, such camera systems are configured to continuously record video footage of a view through a windscreen of a vehicle in which they are mounted. Such camera systems may be attached to the interior of the vehicle windscreen or to the top of the dashboard of the vehicle.

Some known camera systems are operative to capture an image, a sequence of images, and/or record video footage when the vehicle is started, responsive to a user input, and/or automatically responsive to detection of movement of the vehicle.

Typically, a camera is mounted to the superstructure of the vehicle or window by way of an adhesive or suction attachment coupled to the camera through an arm so that the camera field of view is not obstructed by the adhesive or suction attachment or superstructure of the vehicle.

In a typical mount assembly, the arm may be movably attached to one, or both of the attachment or camera. Such an attachment can comprise a ball and socket joint, in which a socket may be tightened around a ball by way of a screw thread and nut arrangement or some other mechanism. This mechanism can serve to prevent movement of the arm so as to maintain its orientation, and thus that of the camera, relative to the surface to which the mount assembly is attached.

A typical mount assembly as described above may be composed of plastic materials. Such materials may degrade over time through repeated heating-cooling cycles, such as experienced in an in-vehicle environment. This may cause the stiffness of an interface between ball and socket joint and a tightening arrangement to lessen over time, which may result in the position of the arm relative to the attachment changing over time, e.g. from a user-set operating position. Such a change may need to be corrected by the user, by repositioning the arm relative to the attachment and by tightening the screw thread and nut arrangement.

A typical mount assembly as described above may not be suitable for a ball and socket joint where the joint comprises a channel therethrough to provide a conduit for routing, for example, an electrical cable to couple electronic circuitry in the attachment to electronic circuitry in a device-coupling element of the assembly. Excessive rotation and/or pivotal movement of the arm relative to the attachment from a factory-designed range of operating positions may be undesirable, because excessive rotation and/or pivotal movement of the arm relative to the attachment may cause damage to the electrical cable.

A typical mount assembly as described above may not be suitable for in-vehicle use, where the assembly may experience vibrations, acceleration forces and deceleration forces. In combination, such vibrations, acceleration forces and deceleration forces may cause a screw thread and nut arrangement to unfasten until, in a potential scenario, the nut is completely uncoupled from the screw thread. This may pose a hazard because, in certain circumstances, the arm may become uncoupled from the attachment, which may result in the arm (and any accessory attached thereto) detaching from the attachment and travelling through a vehicle cabin.

The present invention has been designed with the foregoing in mind.

SUMMARY

According to an aspect of the present invention, there is provided a mount assembly for mounting a device to a surface, comprising: a socket assembly; a mounting element comprising a mounting ball receivable by the socket assembly to pivotally couple the mounting element to the socket assembly to position the mounting element relative to the socket assembly; wherein the socket assembly comprises: a resilient member configured to define a socket to receive and engage the mounting ball, the resilient member configured to permit the mounting ball to be urged into the socket against a resilient bias; a biasing element to bias the resilient member into the socket; and a retention element to inhibit deflection of an end of the resilient member away from the socket.

The inclusion of a retention element to inhibit the deflection of an end of the resilient member away from the socket (i.e. outwardly from the socket) allows for the integrity of the socket defined by the configuration of the resilient member to be maintained, and provides necessary support to the socket wall(s) whilst the mounting ball is received within the socket. This retention element ensures that the mounting ball remains housed within the socket upon operation, inhibiting the disengagement of the ball and the dismantlement of the mount assembly, e.g. when it experiences high acceleration forces.

The biasing element may maintain a uniformity of coefficient of friction between walls of the socket (i.e. as defined by the resilient member) and the mounting ball during heat cycles experienced by the mount assembly in a typical environment in which the mount assembly is located. The respective materials of the resilient member and the mounting ball may be different and so may have different coefficients of thermal expansion and/or the shape and configuration of the resilient member may be different to the shape and configuration of the mounting ball and so may have different coefficients of thermal expansion. In both cases, the presence of the biasing element may inhibit any changes in "tightness" of the assembly caused by potential differing extents of expansion/contraction of the resilient member and mounting ball during different temperature conditions.

Optionally, the retention element may comprise a shroud configured to form a portion of a housing of the socket assembly, the shroud comprising an aperture into which an end of the resilient member can extend, the aperture defining a limit to which the end of the resilient member can be deflected. This may ensure that once the resilient member and the retention element are engaged, the configuration of the socket is fixed. If the mounting ball has been received in the socket defined by the resilient member and the retention element has been engaged, the resilient member is no longer able to flex to increase the diameter of the socket, and thus the mounting ball is constrained within the socket.

Optionally, the mounting element is receivable in the socket assembly through the aperture of the shroud. The shroud may engage with the socket assembly by fitting around the mounting element behind the mounting ball, acting as a collar that closes upon affixment to the socket assembly and inhibiting the liberation of the mounting ball from the socket. This may be useful in instances such as when the device is a dash-cam and when the surface is a vehicle windscreen. During an impact event where the assembly may undergo high acceleration forces (e.g. the impact of a crash), it is important that these two components do not detach in order to maintain footage of the incident and to avoid unnecessary injury to any passengers in the vehicle caused by parts becoming detached from the mount assembly. The arrangement of the mount assembly described herein may reduce a likelihood of occurrence of a decoupling event such as described above.

Optionally, the shroud may be coupleable to a remaining portion of a housing of the socket assembly by at least one coupling element. To ensure that the shroud is securely coupled to the socket assembly, different coupling mechanisms may be used such a screws, clips, latches, or any other fastening means. This ensures that the connection between the shroud and the socket assembly is sufficient to maintain the position of the shroud such that it may provide the restriction required to inhibit the deflection of an end of the resilient member away from the socket, thus securing the mounting ball in place.

Optionally, the at least one coupling element may be located to be accessible from an interior of the remaining portion of the housing. This may make the means to detach the shroud from the remaining portion of the socket assembly housing relatively inaccessible, which may be useful to prevent inadvertent dislodging of the shroud from the remaining portion of the socket assembly housing.

Optionally, the mounting element may comprise an arm with the mounting ball disposed at an end thereof. The shroud may fit around the arm as a collar. Once the mounting ball has been inserted into the socket, the shroud may then affix onto the socket assembly fixing the mounting ball in place and preventing its removal.

Optionally, the mounting element may be configured to be removably coupleable to a device and may comprise a device engagement element at an opposite end to the mounting ball.

Optionally, the socket assembly may be configured to be removably mountable to the surface. Thus, the mount assembly may enable a device to be mounted to a surface, e.g. a dashcam mounted onto a vehicle windscreen, wherein the orientation of the device may be altered by a user, but where the device is held securely to the windscreen by the mount assembly and where detachment of the constituent parts may be inhibited.

Optionally, the socket assembly may comprise a first electronic circuit and the mounting element may comprise a second electronic circuit, and further wherein the first electronic circuit and second electronic circuit may be electronically coupled via an electronic connection between the socket assembly and the mounting element.

Optionally, the mounting ball may comprise a bore to define a passage therethrough for the electronic connection, and/or the arm may comprise a bore in communication with the bore through the mounting ball to define a passage therethrough for the electronic connection. This ensures that any wires, cables and leads forming the electronic connection are protected from overextension, damage via friction, twisting and general exposure by virtue of being located within the arm and mounting ball.

Optionally, the socket assembly may be configured to be removably mountable to the surface. This may allow the mounting device to be used on a variety of different surfaces, allowing the mounting of a given device to take place in a variety of different locations.

BRIEF DESCRIPTION OF THE DRAWINGS

One or more embodiments of the present invention are described further hereinafter, by way of example only, with reference to the accompanying drawings in which.

DETAILED DESCRIPTION OF THE INVENTION

Figure 1:
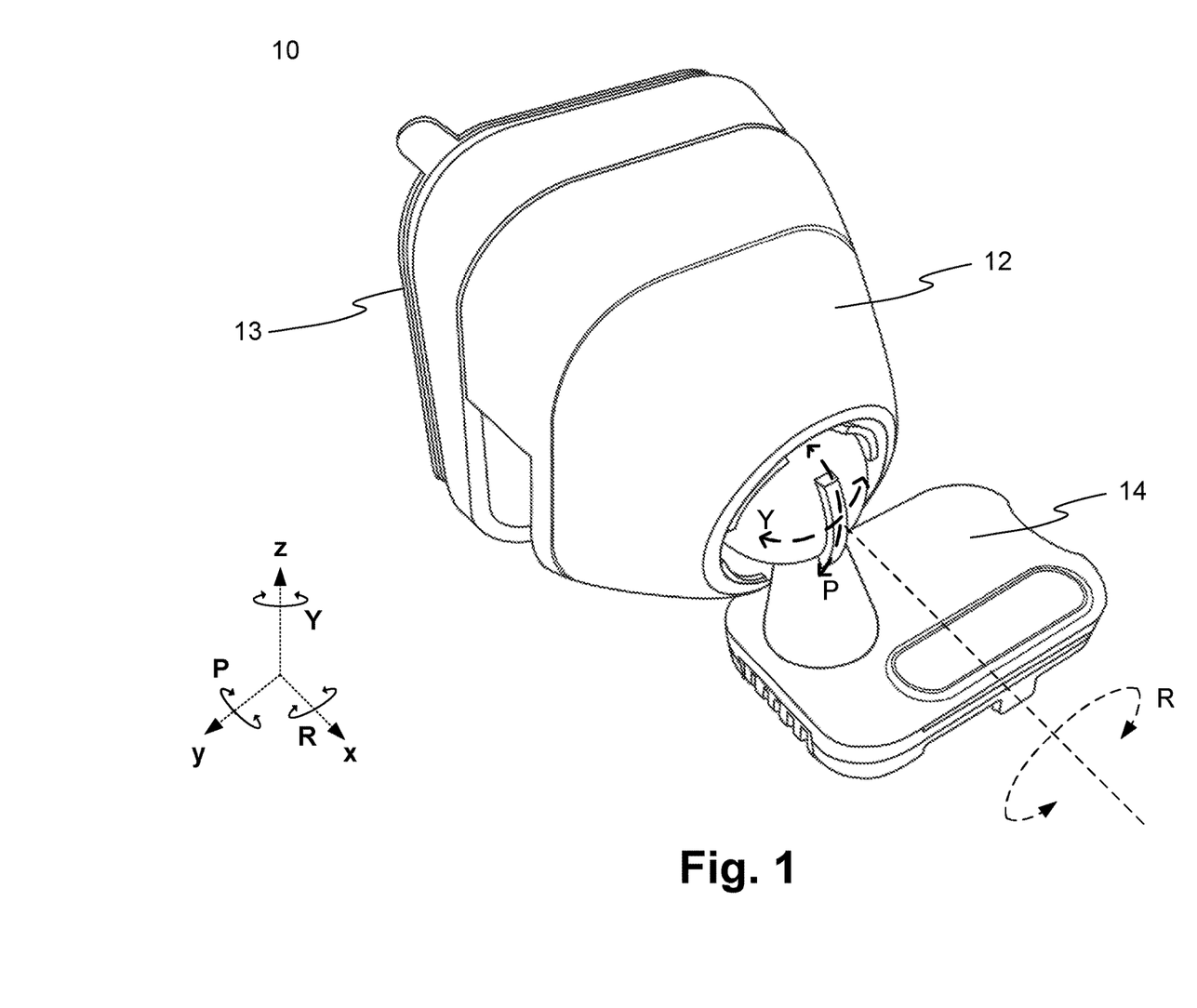
FIG. 1 illustrates an isometric projection of a mount assembly comprising a socket assembly and a mounting element in a first position in accordance with one or more embodiments of the present invention.

FIG. 1 shows an isometric projection of a mount assembly 10 comprising a socket assembly 12 and a mounting element 14 in a first position in accordance with one or more embodiments of the present invention. The mounting element 14 is pivotally coupled to the socket assembly 12 by way of a ball and socket joint. In the illustrated example of one or more embodiments of the invention, the socket is located in the socket assembly, and the ball is located on the mounting element.

In one or more embodiments, the mount assembly 10 may be used to removably couple an accessory to the surface of a vehicle in which it is situated. For example, a dash cam, GPS device, satellite navigation system, and the like may be removably coupled to a windscreen, rear windscreen, or side door window of a vehicle.

In the illustrated example, an accessory (not shown) can be mounted on a free-end of the mounting element 14 and the socket assembly 12 is configured to be removably mountable to a surface, thereby providing a mount to mount the accessory to the surface of a vehicle. The socket assembly 12 can be mounted to a surface, for example a vehicle windshield, by way of a surface attachment element 13. The attachment element 13 may comprise a 3M® adhesive pad, a suction cup, or any other material/device that maintains the mount assembly 10 in a position on a surface.

Figure 2:
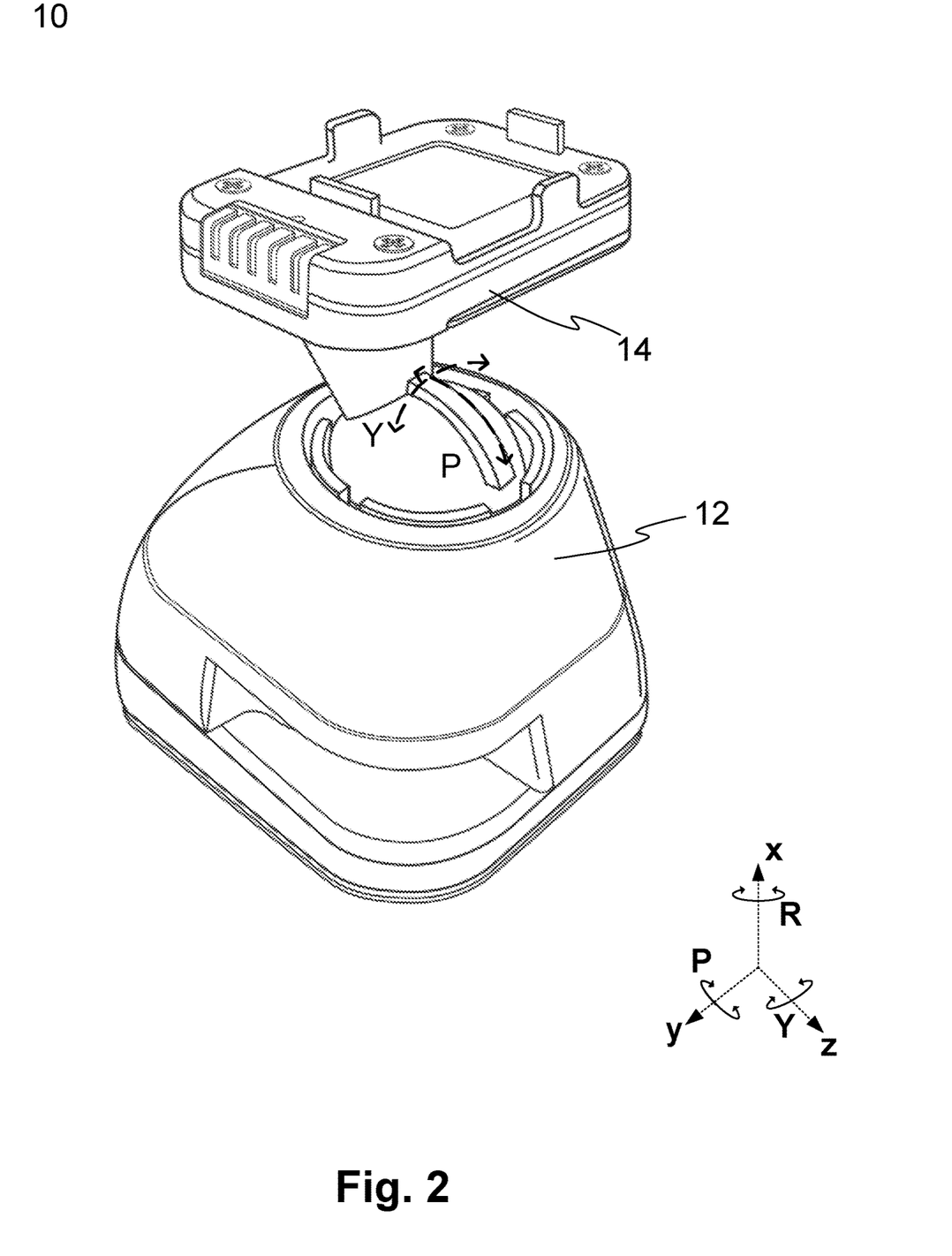
FIG. 2 illustrates an isometric projection of a mount assembly comprising a socket assembly and a mounting element in a second position in accordance with one or more embodiments of the present invention.

FIG. 2 is an isometric projection of a mount assembly 10 comprising a socket assembly 12 and a device mounting element 14 in a second position in accordance with one or more embodiments of the present invention. In FIG. 2 the socket assembly 12 and mounting element 14 are in a second position relative to each other. It will be apparent that the second position is different to the first position of FIG. 1. The mounting element 14 has been rotated in direction P about a y-axis using the ball and socket joint. The properties of a ball and socket joint confer movement in the directions P, R and Y, i.e. about y, x and z axes respectively (see FIGS. 1 and 2). Rotational/pivoting movement about x, y and z axes is referred to as roll (x-axis), pitch (y-axis) and yaw (z-axis) in some fields of technology.

Figure 3:
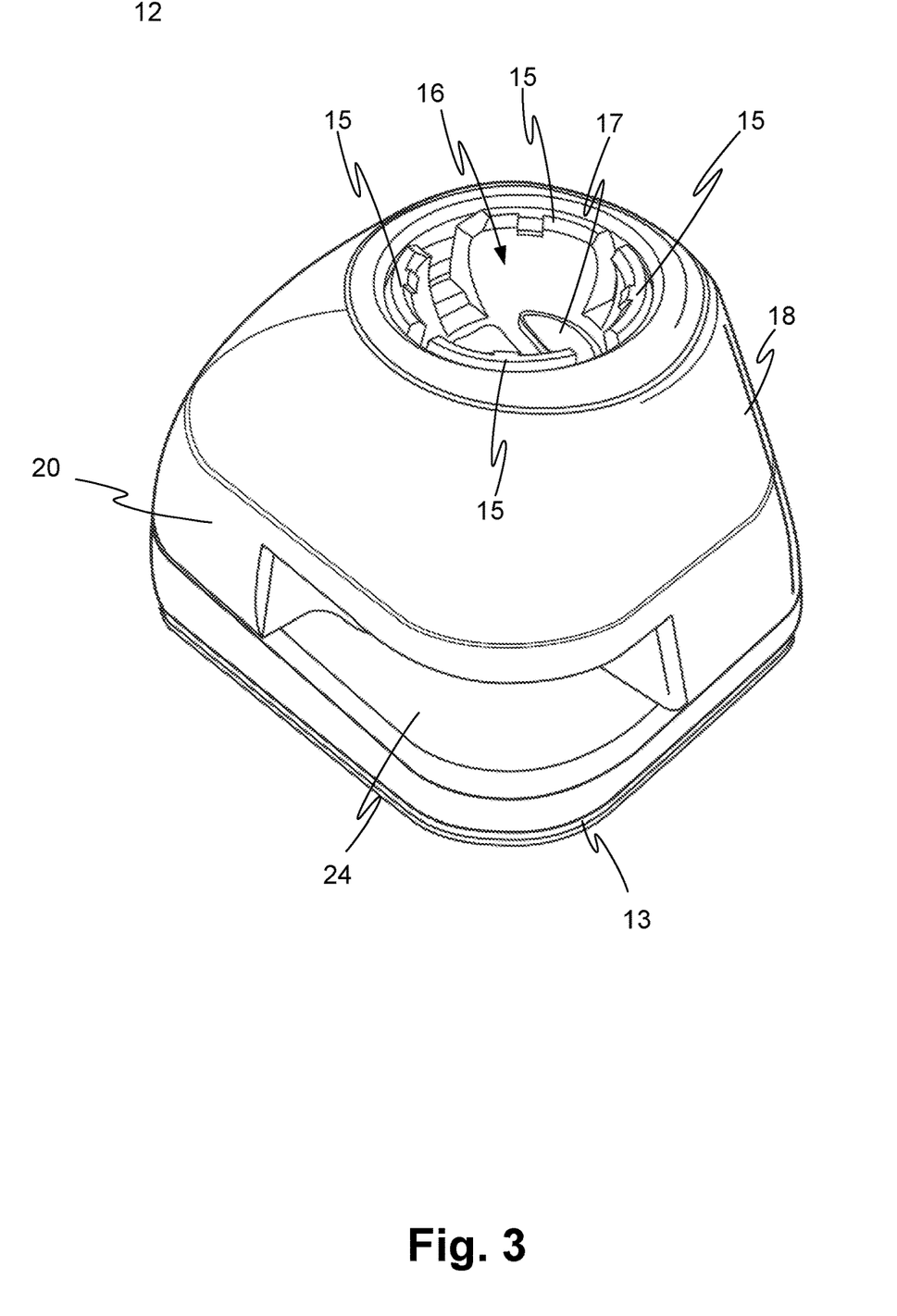
FIG. 3 illustrates an isometric projection of a socket assembly in accordance with one or more embodiments of the present invention.

FIG. 3 shows an isometric projection of the socket assembly 12 in accordance with an embodiment of the present invention. The socket assembly 12 comprises: a plurality of resilient members 15 arranged to define a socket 16; a shroud portion 18 configured to form an upper part of a socket assembly housing; and a base portion 20 configured to form a lower part (a remaining part) of a socket assembly housing. The shroud portion 18 is coupleable to the base portion 20.

Base portion 20 comprises an aperture 24 to provide access to an electrical connection port (not shown), which is configured to provide a connection to an electronic circuit contained within base portion 20. For example, the aperture 24 provides a space to receive a USB coupling to couple an external device to the electronic circuit (e.g. comprising a GPS circuit) in the base portion 20 of socket assembly 12.

At least one surface interface member 17 is disposed in the socket 16. The at least one surface interface member 17 is configured to provide a frictional interface between the outer surface of a mounting ball receivable in the socket 16 and an inner wall of the socket 16. In this illustrative embodiment the at least one surface interface member 17 comprises a silicon pad and provides an additional frictional contact with the mounting ball of mounting element. The properties of the at least one surface interface member 17 is such that it provides a soft, frictional surface that conforms to the shape of the mounting ball so as to reduce the wear of the outer surface of said ball mounting formation, and to increase resistance to movement of the mounting ball relative to the socket.

The at least one surface interface member 17 may be situated on the inside of one or more resilient members 15 defining the socket 16, or at the base of the socket 16.

Figure 4:
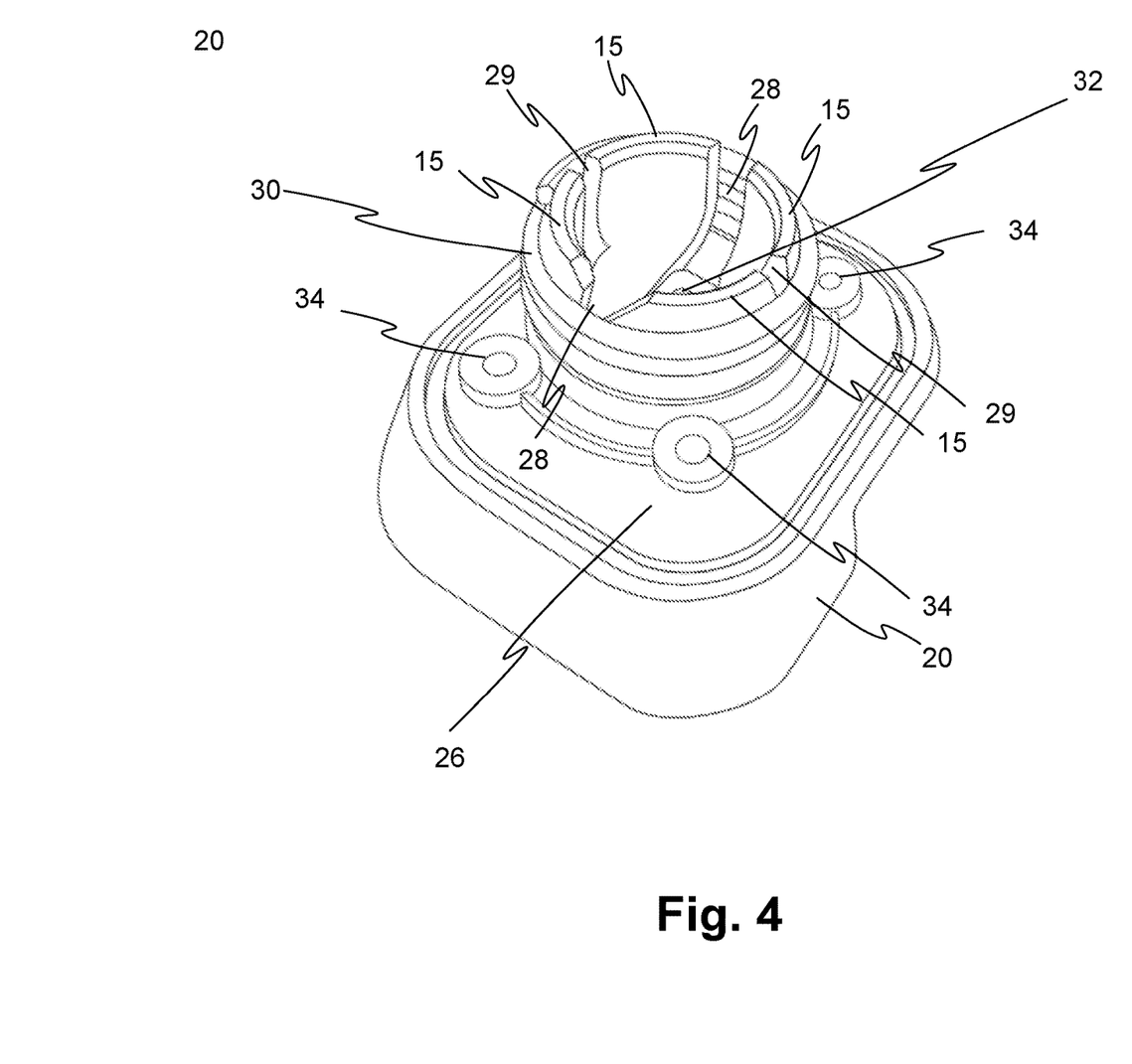
FIG. 4 illustrates an isometric projection of a first portion of a socket assembly in accordance with one or more embodiments of the present invention.

FIG. 4 is an illustrative isometric projection of the base portion 20 of socket assembly. In this illustrative example, the shroud (not shown) has been removed to expose the inner elements of the base portion 20 of socket assembly 12. The base portion 20 comprises the plurality of resilient members 15, which comprise four arcuate flanges arranged such that free ends thereof define a circular mount of the socket 16. The plurality of resilient members extend from a surface 26 and define a space therebetween that defines the socket 16. The socket 16 is configured to receive a mounting ball of mount element 14. The arcuate form of the plurality of resilient members 15 and their location with respect to each other is such so as to space therebetween that is complementary to a shape of a mounting ball receivable therein. The resilience of the plurality of resilient members 15 serves to urge the ends of the plurality of resilient members 15 inwards to the space of the socket 16 and to resist deformation of the members 15 and deflection of the ends thereof in an outward direction, away from the space of the socket 16. This configuration can urge a mounting ball located in the socket 16 into the socket 16 to maintain engagement of the mounting ball and the socket 16, and resist disengagement of the mounting ball from the socket 16.

Channels 28, 29 define spaces between neighbouring pairs of the plurality of resilient members 15. A first set of these channels 28 can serve to receive a formation, or formations, located on a surface of the mounting ball of the mounting element, where interaction of the formation(s) with walls of the channels 28 can restrict movement of the mounting element relative to the socket assembly.

The base portion 20 also comprises a biasing element 30 disposed so as to exert an inwardly directed force on the plurality of resilient members 15. In the illustrated example of FIG. 4, the biasing element 30 comprises a helical spring disposed as a sleeve around the plurality of resilient members 15, so as to encircle the plurality of resilient members 15. The biasing element 30 provides a force that resists outward movement of said plurality of resilient members 15. Namely, it provides a biasing force inwards so that the plurality of resilient members 15 are biased inwards toward the space within the socket 16. Further, biasing element 30 may maintain a uniformity of coefficient of friction between walls of the socket 16 (i.e. plurality of resilient members 15) and the mounting ball during heat cycles experienced by the mount assembly in a typical environment in which the mount assembly is located. The respective materials of the plurality of resilient members 15 and the mounting ball may be different and so may have different coefficients of thermal expansion and/or the shape and configuration of the plurality of resilient members 15 are different to the shape and configuration of the mounting ball and so may have different coefficients of thermal expansion. In both cases, the presence of the biasing element 30 may inhibit any changes in "tightness" of the assembly caused by potential differing extents of expansion/contraction of the plurality of resilient members 15 and mounting ball during different temperature conditions.

In the bottom of the socket 16 there is a bore 32 extending through the surface 26 to an opposite side (not shown) of the surface. This is provided so as to allow an electrical connection, such as a wire, or cable, to pass between the socket 16 and an opposite side of the base portion 20.

The base portion 20 also comprises holes 34 that extend through the surface 26 to an opposite side (not shown) of the surface. Such holes 34 provide apertures through which fixing elements can pass to be received in corresponding receiving channels in the shroud portion 18. This arrangement serves to secure the shroud portion 18 to the base portion 20. For example, screws, bolts or other fixing elements may be used for this purpose.

Figure 5:
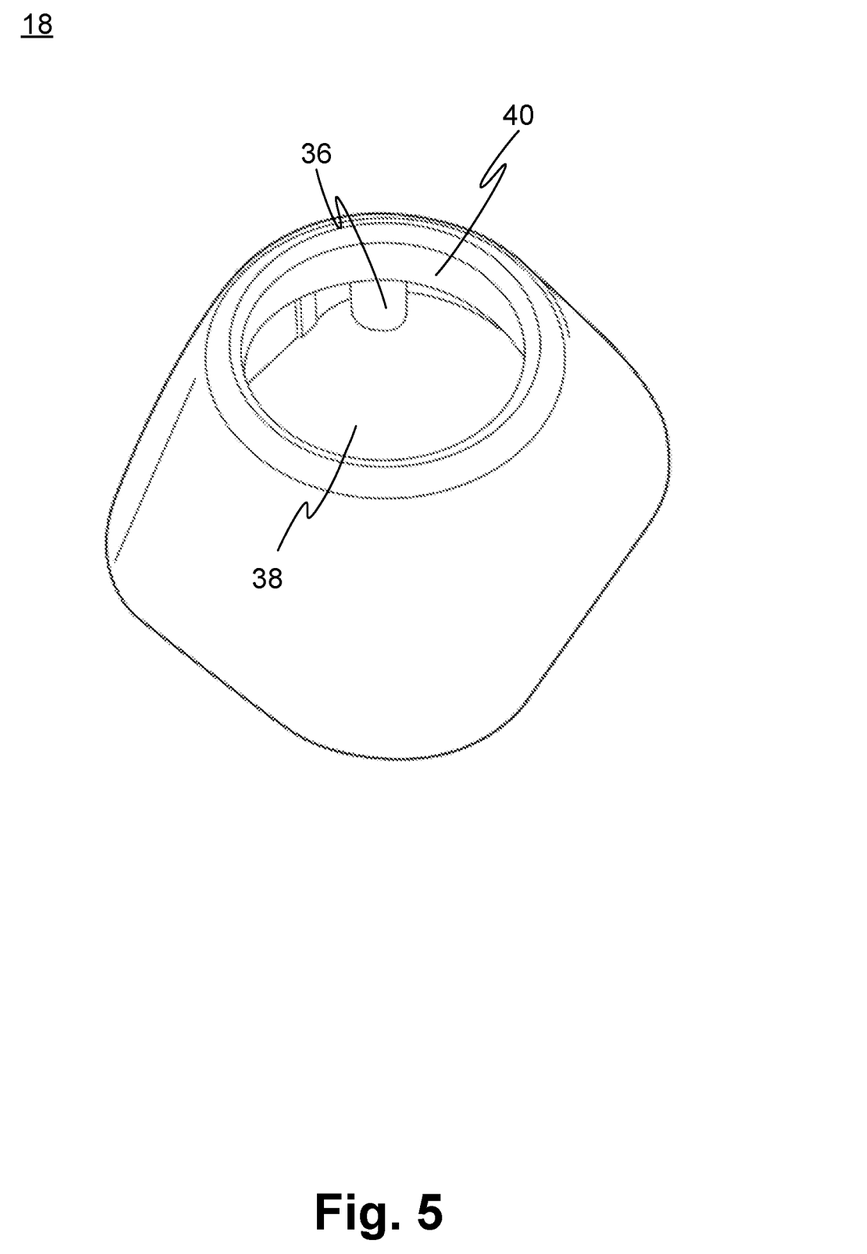
FIG. 5 illustrates an isometric projection of a second portion of a socket assembly viewed from a first position in accordance with one or more embodiments of the present invention.

FIG. 5 shows an illustrative example of the shroud 18. FIG. 5 shows the shroud portion 18 oriented so that an outer surface thereof is presented. As previously described, the shroud portion 18 can be removably coupled to base portion 20 by locating filing elements to extend through holes 34 of the base portion 20 to be received in corresponding receiving channels in the shroud portion 18. One of the receiving channels 36 is shown in FIG. 5.

The shroud portion 18 comprises an aperture 38 that extends through the shroud portion 18. The aperture 38 comprises two sections having different circumferences. A first section 40 has a circumference that is larger than a circumference defined by outer edges of each of the remote ends of the plurality of resilient members 15. When the shroud portion 18 is coupled to the base portion 20 the aperture 38 is located such that it is concentric with a circle defined by defined by outer edges of each of the remote ends of the plurality of resilient members 15. The first section 40 of the aperture 18 can serve as a retention element to limit deflection of ends of the plurality of resilient members outwardly from the socket (i.e. in a direction away from the socket).

A second section of aperture (not shown in FIG. 5, see 44 in FIG. 6) has a circumference that is larger than that of the first section 40 and is of a size sufficient to receive the biasing element 30 in a push-fit arrangement. That is, the circumference of the second section of aperture 38 is large enough to encircle the biasing element 30.

The difference in circumferences between the first section 40 and the second section (not shown in FIG. 5, see 44 in FIG. 6) is such that the interface between the two sections forms a lip (not shown in FIG. 5, see 42 in FIG. 6) that can provide a blocking surface to prevents the biasing element 30 from being removed from the socket assembly (when the shroud portion 18 and base portion 20 of the socket assembly are in an assembled state).

In combination, the biasing and retention elements may serve to reduce the likelihood of a mounting ball being decoupled, or disengaged, from the socket under exertion of excessive forces on the mount assembly.

Figure 6:
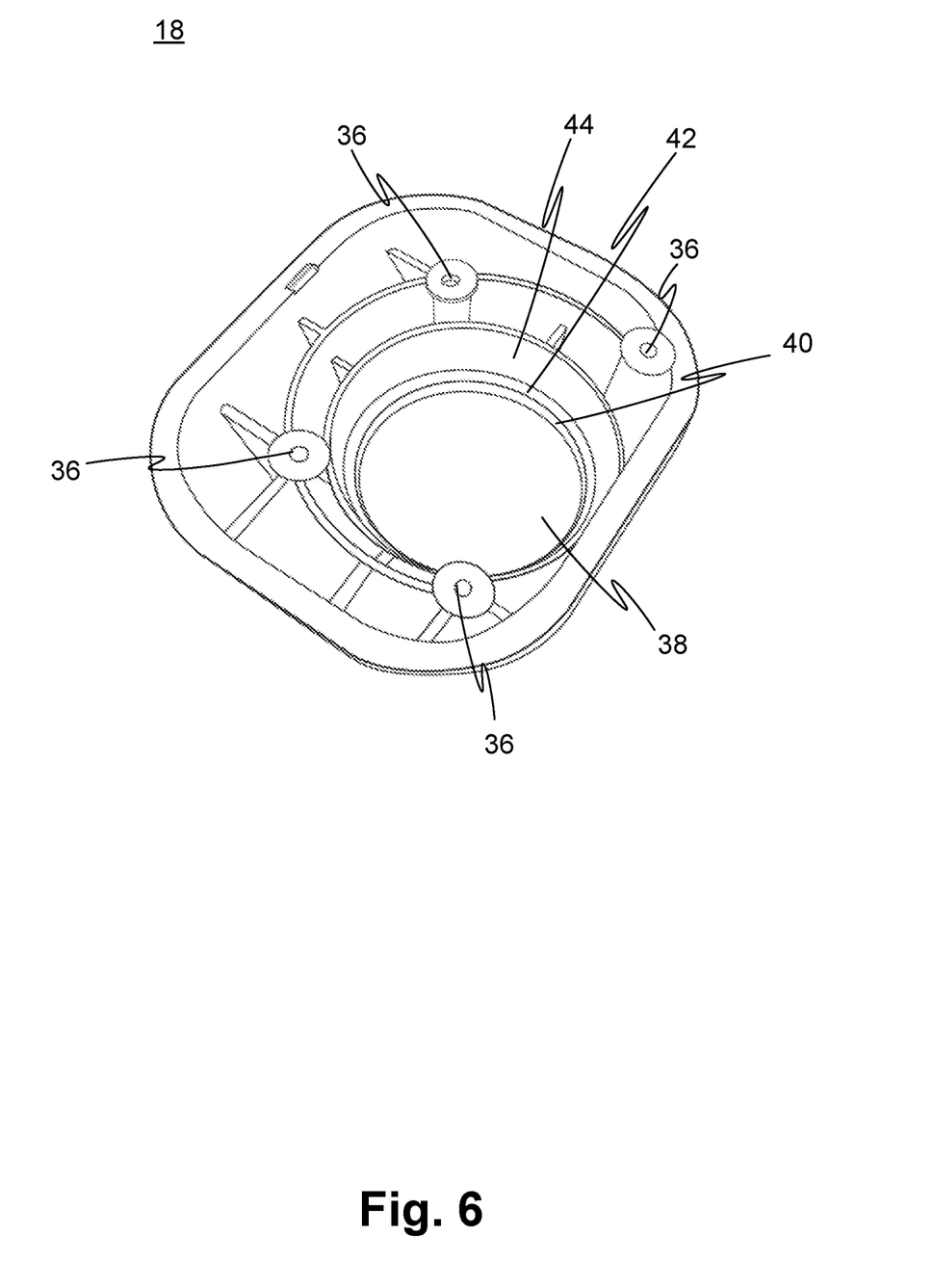
FIG. 6 illustrates an isometric projection of a second portion of a socket assembly viewed from a second position in accordance with one or more embodiments of the present invention.

FIG. 6 shows an illustrative isometric projection of the shroud portion 18 with the shroud portion oriented so that an inner surface thereof is presented. FIG. 6 shows four fixing element receiving channels 36, which correspond to the holes 34 of the base portion 20. Viewed in this orientation, lip 42 formed by the interface between first section 40 and second section 44 is now visible. The biasing element cannot pass through aperture 38 due to the lip 42.

As described above, walls of the aperture 38 that define the first section 40 provides a retention element that can serve to inhibit movement of the ends of the plurality of resilient members 15. Thus, in combination with the biasing element 30, the retention element increases an inward bias of the resilient members 15 in a direction inwardly into the socket, and so increases a force exerted on a mounting ball located in the socket 16. This provides a system that allows pivotal movement of the mount element 14 relative to the socket assembly 12, but which provides a resistance to prevent movement of the mounting element relative to the socket assembly in the absence of user-applied force. This may allow a user to set a position of the mount element 14 relative to the socket assembly 12 without having to use an additional element to set the position (e.g. tighten a nut). The biasing and retention elements may provide enough resistance to relative movement between the mount element and the socket assembly such that, when the mount assembly is subjected to vibrations and/or acceleration forces, e.g. when a vehicle is in motion, an accessory coupled to the mount assembly does not move after being set by the user. Additionally, decoupling, or disengagement, of the mounting ball from the socket assembly under exertion of excessive forces may be inhibited.

Figure 7:
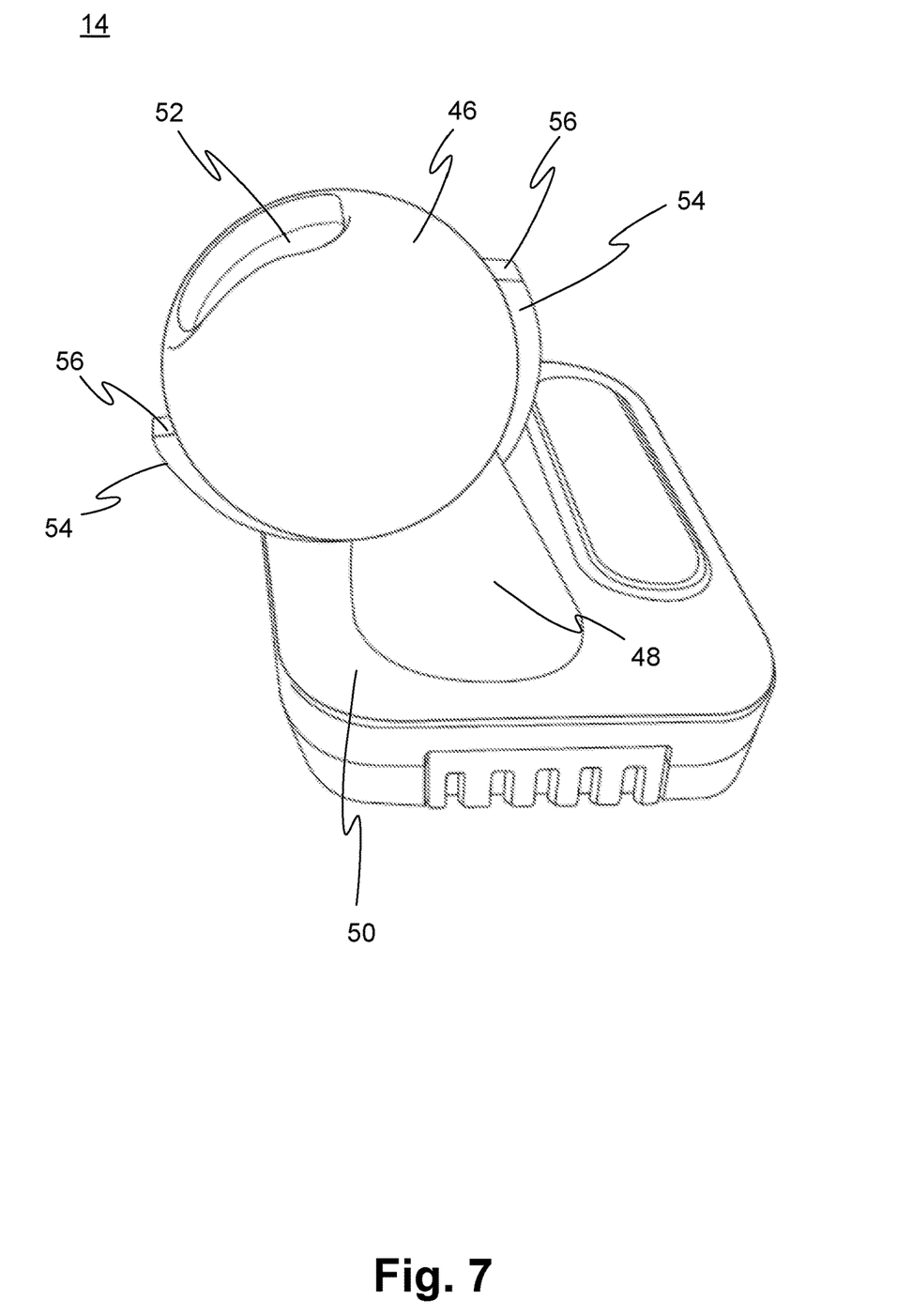
FIG. 7 illustrates an isometric projection of a mounting element viewed from a first position in accordance with one or more embodiments of the present invention.

FIG. 7 is an illustrative isometric drawing of the mount element 14 when viewed from a first position. The mount element 14 comprises a mounting ball 46 disposed at one end of an arm 48. The mount element 14 comprises a device engagement element 50 disposed at an opposite end of the arm 48. The mounting ball 46 has a diameter that is of a size to permit a push-fit engagement of the mounting ball 46 with the socket 16 of socket assembly 12, which, as described above, provides a frictional engagement between the mounting ball 46 and the socket 16. Additionally, the device engagement element 50 can be used as an electromechanical coupling between an electronic circuit housed in the mount assembly 10 and electronic circuitry of an accessory coupled to device engagement element 50.

A bore 52 that extends through the mounting ball 46 and arm 48 provides a passage between the mount element 14 and the socket assembly 12 for an electrical connection. This may be provided by use of a wire, or cable that extends therethrough. As described below, this can provide an electrical connection between a first electronic circuit, such as a GPS module, contained within the socket assembly 12 and a second electronic circuit, located in device engagement element 50 of mount element 14.

Mounting ball 46 comprises at least one formation extending from a surface thereof. In the illustrated example, the at least one formation comprises two vanes 54 that extend radially from the surface of the mounting ball 46. When the mounting ball 46 is located in the socket 16 of socket assembly 12, the vanes 54 occupy the channels 28 between the resilient members 15.

Interaction of the vanes 54 with walls of the channels 28 can restrict movement of the mounting element relative to the socket assembly. Thus, the interaction of the vanes 54 with walls of the channels 28 may serve to inhibit pivotal movement in the direction Y (see FIGS. 1 and 2, i.e. about a yaw axis) to a relatively small amount and inhibit rotational movement in the direction R (see FIGS. 1 and 2, i.e. about a roll axis) to a relatively small amount, whilst permitting pivotal movement in the direction P (see FIGS. 1 and 2, i.e. about a pitch axis) to an amount larger than permitted in the Y and R directions. That is to say the vanes 54 are configured to interact to inhibit rotational movement and pivotal movement about a yaw axis of the mounting element 14 relative to the socket assembly 12.

When the mounting element 14 is pivoted in the direction ±R, the side of the vanes 54 engage with the walls of the channels thereby preventing any further movement in that direction. However, and as described above, motion of the mounting element 14 in the direction P is permitted over a much larger range of relative movement because the vanes 54 move through the channels 28 until an end 56 of a vane 54 engages the bottom of a channel 28.

Figure 8:
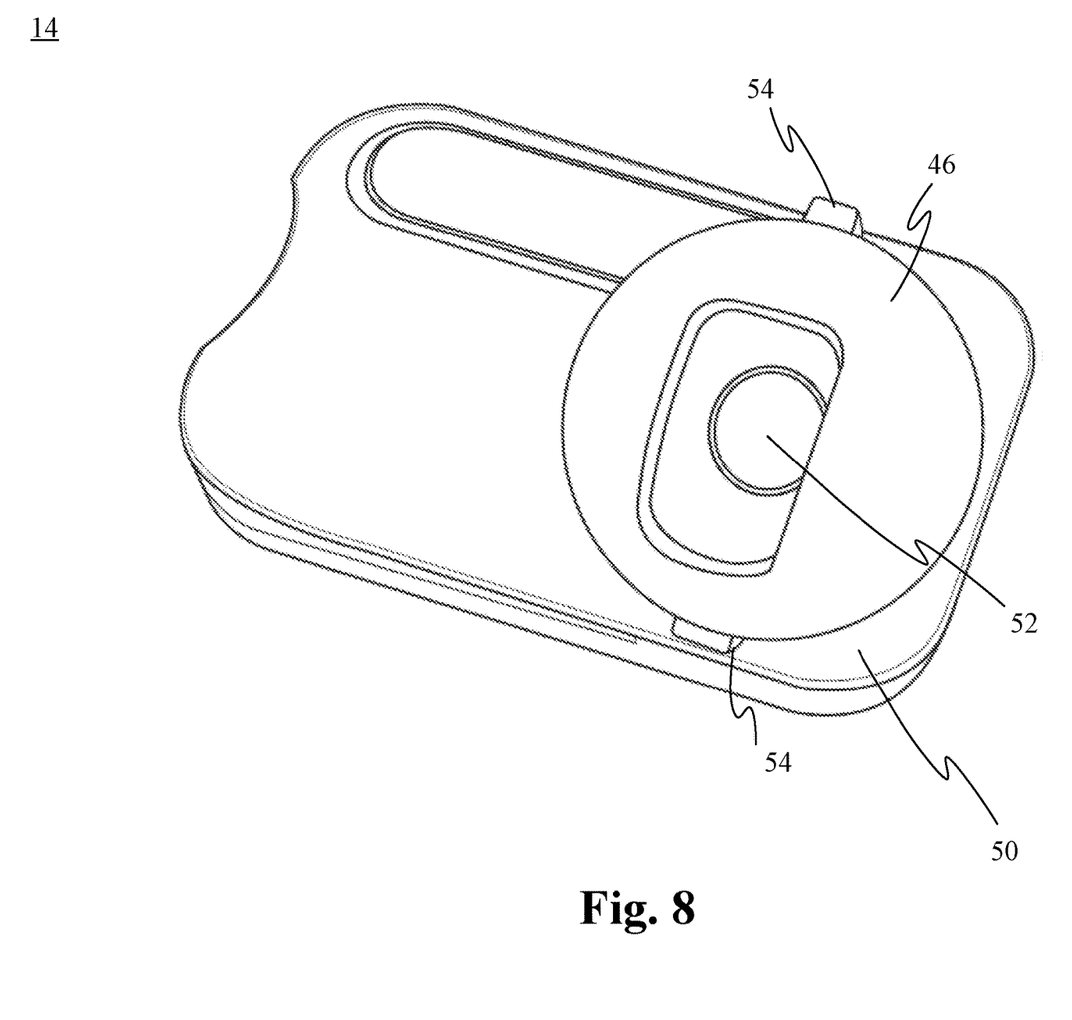
FIG. 8 illustrates an isometric projection of a mounting element viewed from a second position in accordance with one or more embodiments of the present invention.

FIG. 8 is an illustrative isometric drawing of the mounting element 14 when viewed from a second position. In FIG. 8, the bore 52 is more clearly visible.

Figure 9:
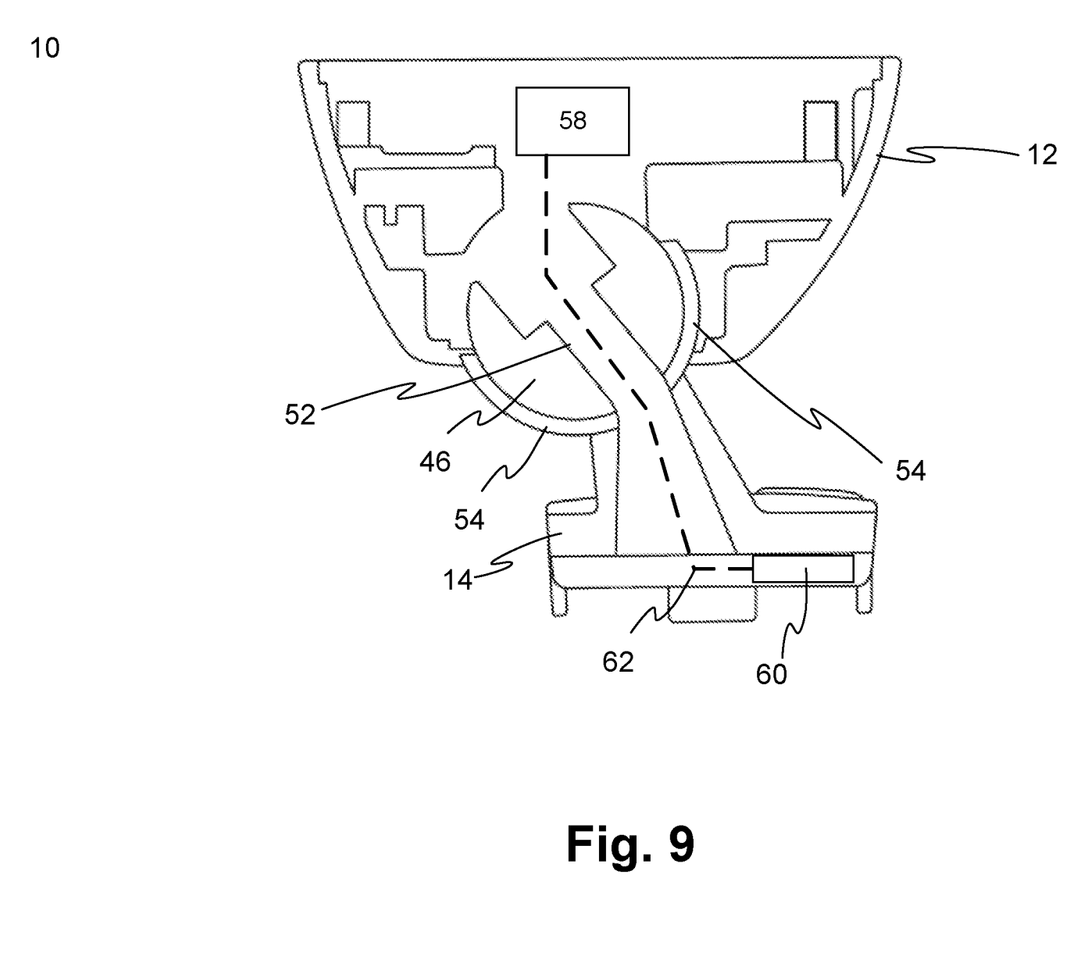
FIG. 9 shows an illustrative sectional view of the mount assembly in accordance with one or more embodiments of the present invention.

As indicated above, the socket assembly 12 may comprise an electronic circuit, for example a GPS module. An illustrative sectional view of the mount assembly 10 is shown in FIG. 9, which is described below.

A first electronic circuit 58 in the socket assembly 12 can be electrically coupled to a second electronic circuit 60 located in mounting element 14. Data of the first electronic circuit 58 (e.g. data of a GPS module) can be communicated to the second electronic circuit 60 of mounting element 14 by way of an electrical connection 62. The electrical connection 62 passes from the first electronic circuit 58 to the second electronic circuit 60 through the bore 52. The bore 52 provides a conduit from the socket assembly 12 to the mounting element 14.

Furthermore, an electro-mechanical coupling between an accessory and the mounting element 14 can serve to transfer the data from the second electronic circuit 60 to the accessory coupled to the mounting element 14.

Providing a GPS module in the socket assembly 12 may result in the GPS module being positioned closer to the exterior of a vehicle in which it is situated. For example, if the device is a dash cam to be mounted to a windshield of a vehicle, the GPS module contained within the socket assembly 12 of mount assembly 10 is closer to the windshield, which may improve a line-of-sight connection between the GPS module and a remote device. For this reason, a mount assembly 10 with a GPS module 58 located in the socket assembly 12 as described above may provide more accurate measurements from the GPS module 58.

In one or more embodiments of the present invention described above, the socket 16 of socket assembly 12 is described as comprising a plurality of resilient members 15. In the illustrated embodiment there are four resilient members. However, it would be apparent to a person skilled in the art that there may be other arrangements with greater, or fewer resilient members to define the socket 16. In an optional arrangement, the socket 16 may be defined by a single resilient member, which may comprise a circular flange.

In one or more embodiments of the present invention described above, the biasing element 30 comprises a helical spring. In optional arrangements, the biasing element may comprises any other arrangement or device that provides a resistance to the outward movement plurality of resilient members 15, i.e. any other arrangement or device to provide a compressive force acting inwardly on the plurality resilient members 15.

Any references made herein to orientation (e.g. top, bottom, upper, lower, front, back, and rear) are made for the purposes of describing relative spatial arrangements of the features of the apparatus, and are not intended to be limiting in any sense.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, the terms "a" or "an" are employed to describe elements and components of the invention. This is done merely for convenience and to give a general sense of the invention. This description should be read to include one or at least one and the singular also includes the plural unless it is obvious that it is means otherwise.

In view of the foregoing description it will be evident to a person skilled in the art that various modifications may be made within the scope of the invention. For example, embodiments in accordance with the invention are not limited to any of the particular materials disclosed herein. Other materials suitable for performing the function described herein for a particular material may also be utilized in embodiments of the invention.

The scope of the present disclosure includes any novel feature or combination of features disclosed therein either explicitly or implicitly or any generalisation thereof irrespective of whether or not it relates to the claimed invention or mitigate against any or all of the problems addressed by the present invention. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

The invention claimed is:

1. A mount assembly for mounting a device to a surface, comprising:
    a socket assembly;
    a mounting element comprising a mounting ball receivable by the socket assembly to pivotally couple the mounting element to the socket assembly to position the mounting element relative to the socket assembly;
    wherein the socket assembly comprises:
        a resilient member configured to define a socket to receive and engage the mounting ball, the resilient member configured to permit the mounting ball to be urged into the socket against a resilient bias;
        a biasing element in direct contact with the resilient member to exert an inwardly directed force on the resilient member so that the resilient member is biased inwards toward space within the socket; and
        a retention element to inhibit deflection of an end of the resilient member away from the socket.

2. The mount assembly according to claim 1, wherein the retention element comprises a shroud configured to form a portion of a housing of the socket assembly, the shroud comprising an aperture into which an end of the resilient member can extend, the aperture defining a limit to which the end of the resilient member can be deflected.

3. The mount assembly according to claim 2, wherein the mounting element is receivable in the socket assembly through the aperture of the shroud.

4. The mount assembly according to claim 2, wherein the shroud is coupleable to a remaining portion of a housing of the socket assembly by at least one coupling element.

5. The mount assembly according to claim 4, wherein the at least one coupling element is located to be accessible from an interior of the remaining portion of the housing.

6. The mount assembly according to claim 1, wherein the mounting element comprises an arm with the mounting ball disposed at an end thereof.

7. The mount assembly according to claim 6, wherein the mounting element is configured to be removably coupleable to a device.

8. The mount assembly according to claim 7, wherein the mounting element comprises a device engagement element at an opposite end thereof.

9. The mount assembly according to claim 1, wherein the socket assembly is configured to be removably mountable to the surface.

10. The mount assembly according to claim 1, wherein the socket assembly comprises a suction element and/or an adhesive element configured to attach the socket assembly to the surface.

11. The mount assembly according to claim 1, wherein the socket assembly comprises a first electronic circuit and the mounting element comprises a second electronic circuit, and further wherein the first electronic circuit and second electronic circuit are electronically coupled via an electronic connection between the socket assembly and the mounting element.

12. The mount assembly according to claim 11 wherein the mounting ball comprises a bore to define a passage therethrough for the electronic connection.

13. The mount assembly according to claim 12, wherein the mounting element comprises an arm with the mounting ball disposed at an end thereof, and wherein the arm comprises a bore in communication with the bore through the mounting ball to define a passage therethrough for the electronic connection.

14. The mount assembly according to claim 1, wherein the mounting element is rotatable with respect to the socket assembly to position the mounting element relative to the socket assembly.

15. The mount assembly according to claim 1, wherein the mounting element comprises movement restrictors on the mounting ball, the movement restrictors to inhibit rotational and/or pivoting movement of the mounting element relative to the socket assembly.

16. The mount assembly according to claim 1, wherein the resilient member is formed of a material with sufficient resilience to bias against the mounting ball to produce sufficient friction between the resilient member and the mounting ball to prevent movement of the mounting element relative to the socket assembly in an absence of user-applied force.

17. The mount assembly according to claim 1, wherein the resilient member is curved to conform to an outer surface of the mounting ball and to engage the mounting ball at and/or above an equator of the mounting ball to retain the mounting ball in the socket.

18. The mount assembly according to claim 1, wherein the biasing element comprises a resiliently biased member.

19. The mount assembly according to claim 18, wherein the resiliently biased member comprises a helical spring located to surround the resilient member.

20. The mount assembly according to claim 1, wherein the resilient member comprises a circular flange.

21. The mount assembly according to claim 1, wherein the resilient member comprises a plurality of arcuate sections.

22. A socket assembly for a mount assembly as defined in claim 1.

23. A mounting element for a mount assembly as defined in claim 1.

* * * * *